United States Patent Office 3,389,671
Registered June 25, 1968

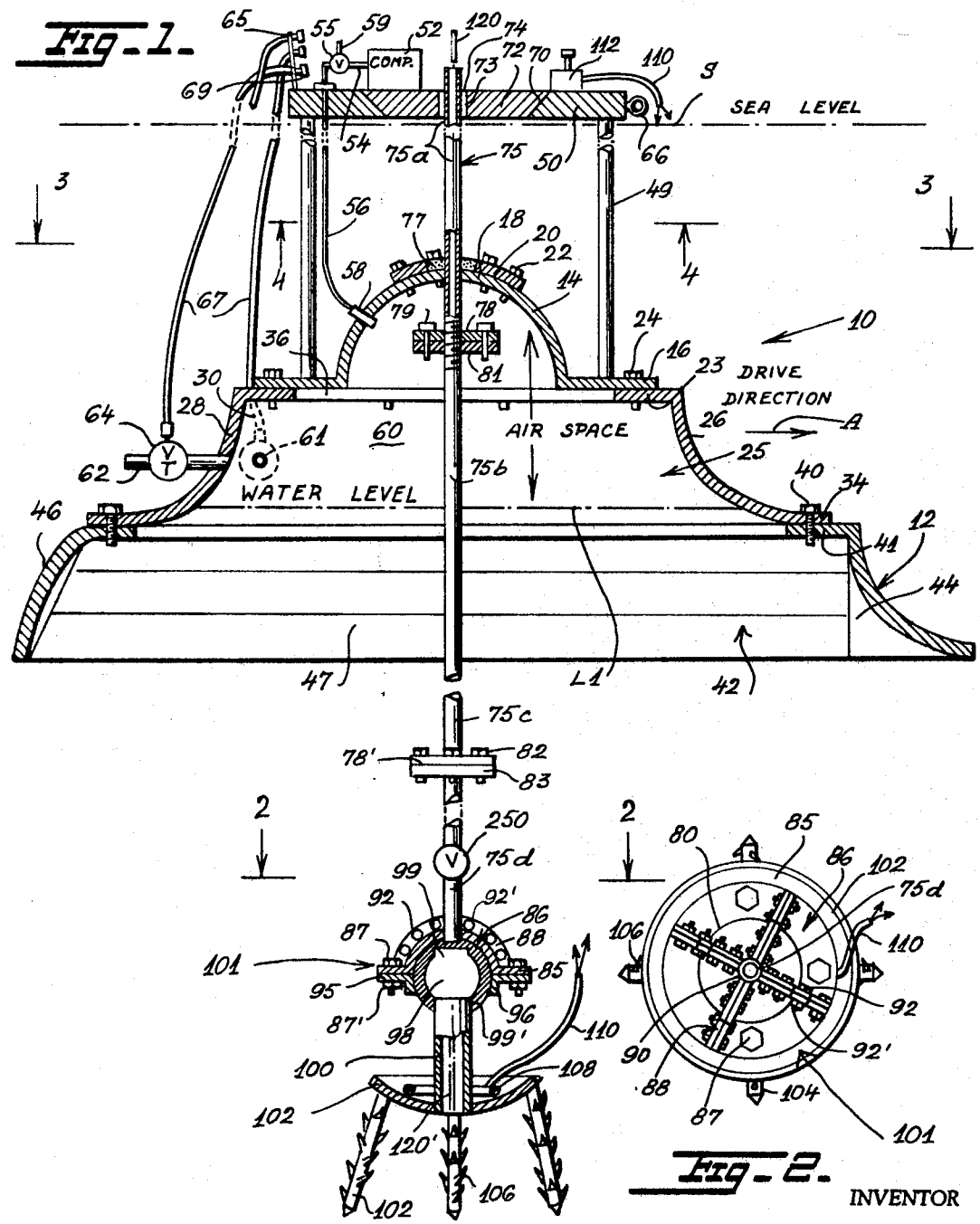

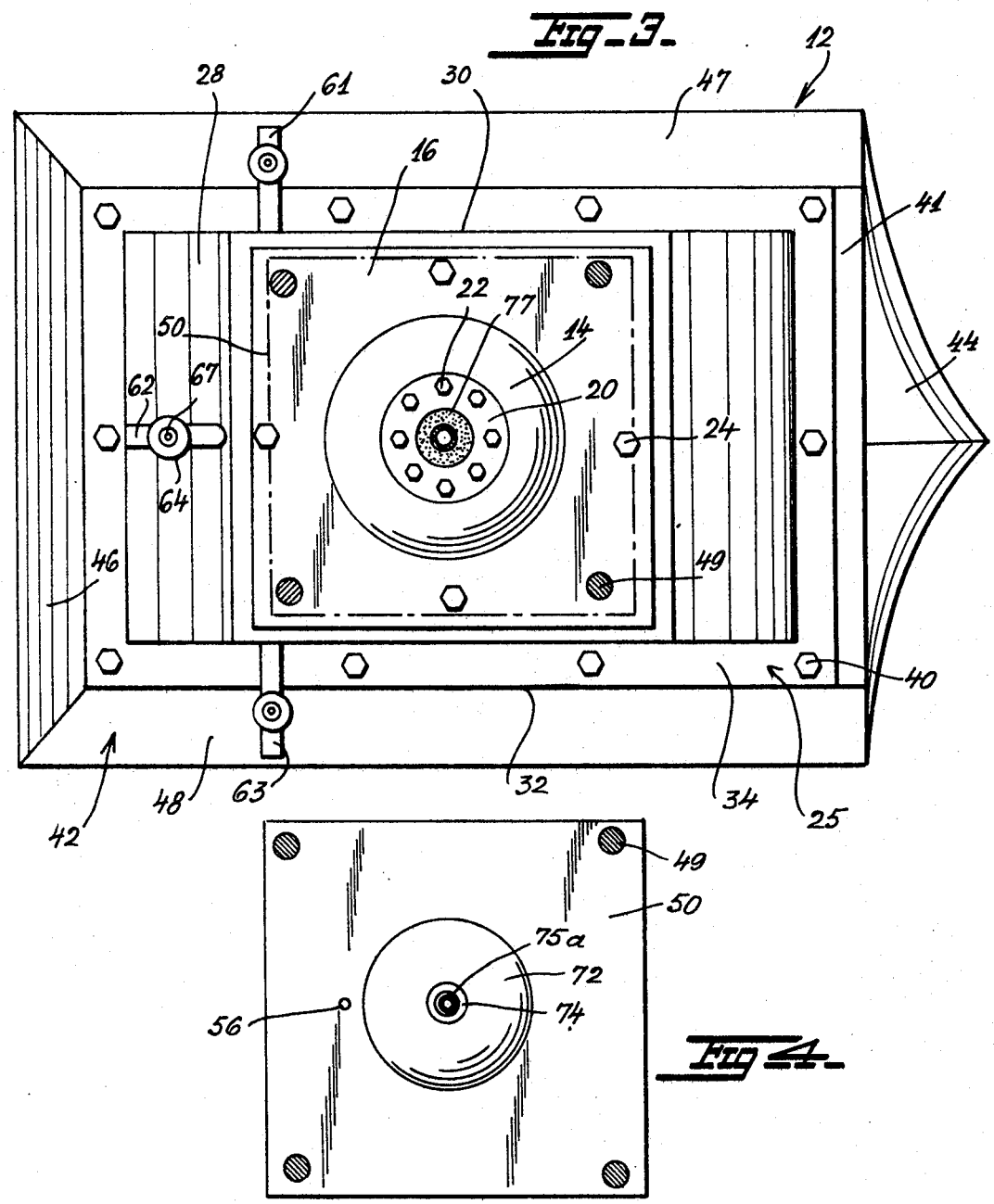

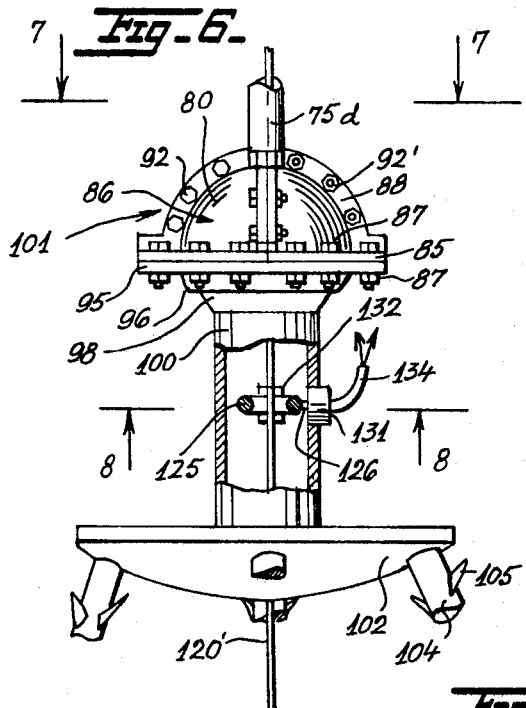
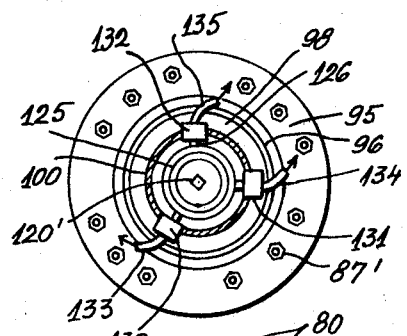
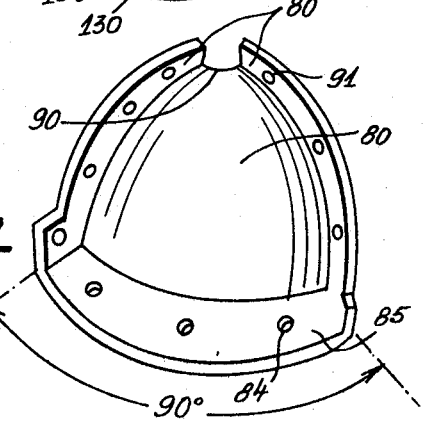
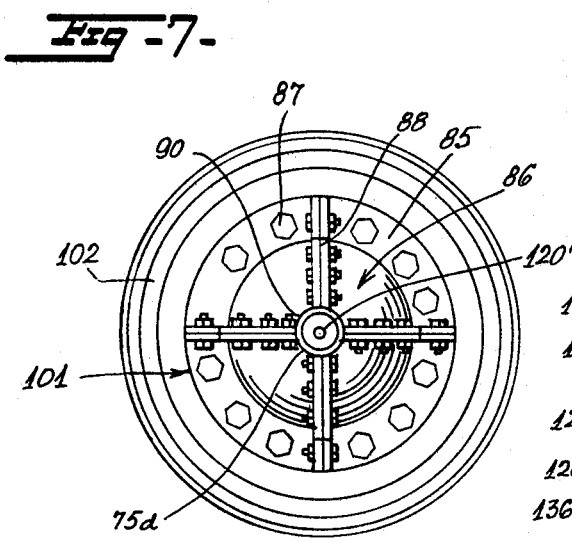
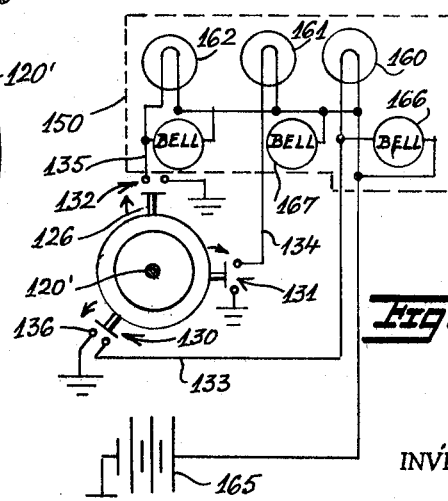

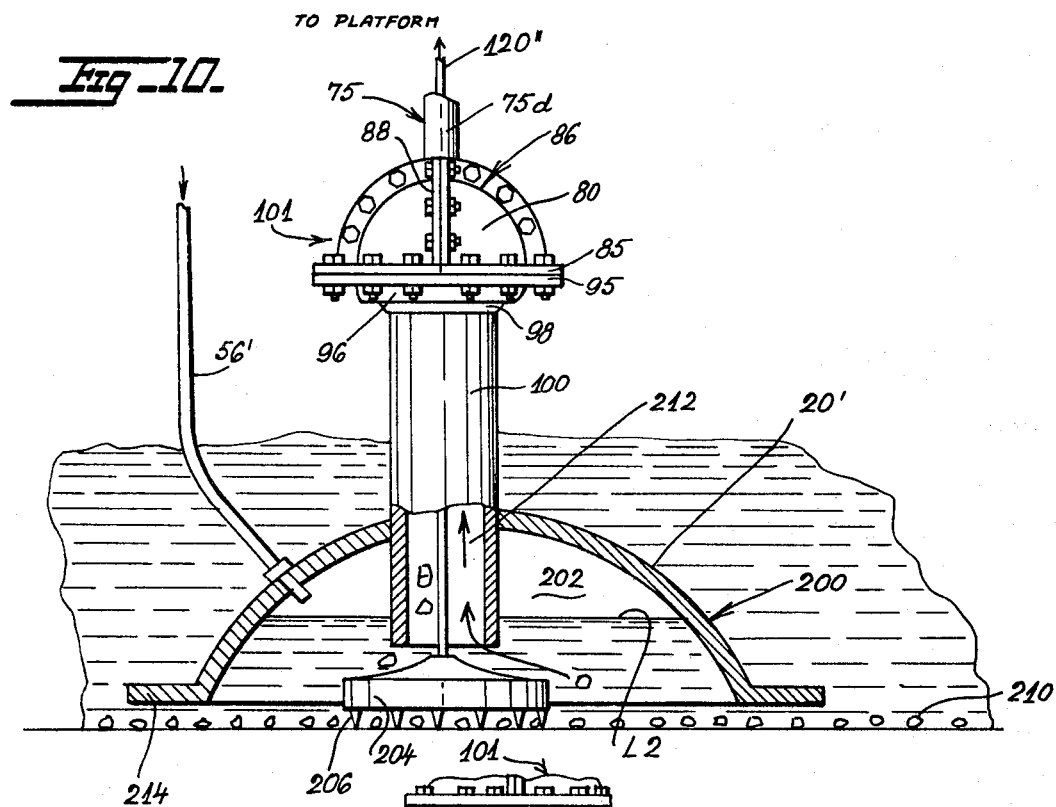
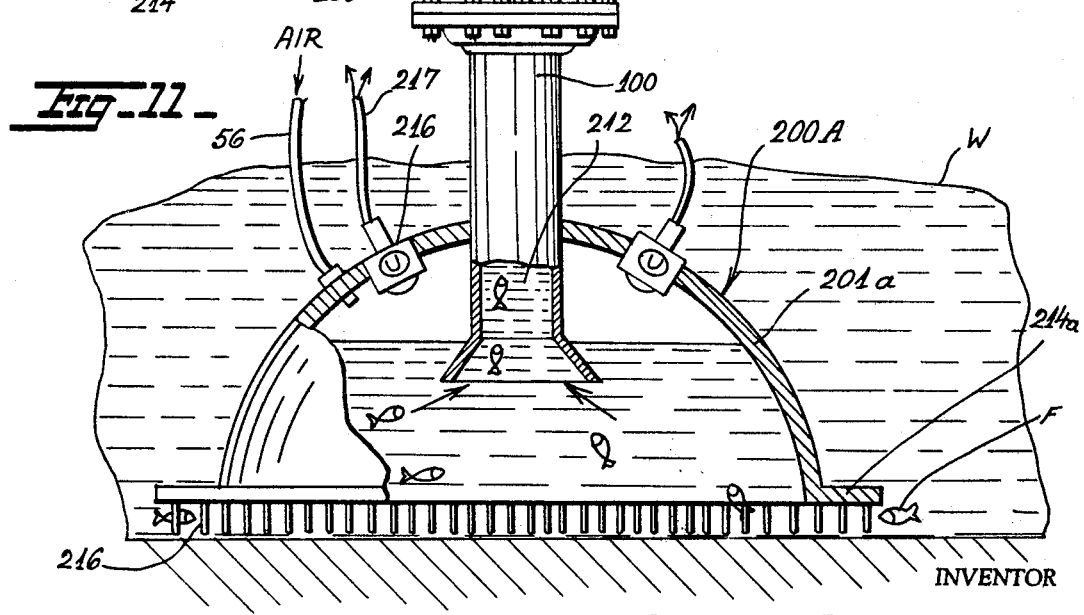

3,389,671
FLOATING ASSEMBLY FOR OFF-SHORE DRILL-
ING, MINING OR FISHING PLATFORM
Oscar A. Yost, 302 W. 22nd St.,
New York, N.Y. 10010
Filed Jan. 3, 1967, Ser. No. 607,069
8 Claims. (Cl. 114—.5)

ABSTRACT OF THE DISCLOSURE

The disclosure describes a floating assembly including a large platform mounted on a large tapered buoyant dome wholly immersed in a body of water. The platform is supported above the water surface. An air filled compartment is maintained in the dome to control buoyancy and position of the assembly. The assembly can be self propelled to a site of deep sea operations by air jets emitted from the dome which is supplied with air under pressure. The assembly can be used for well drilling operations, or with proper attachments for surface mining, fishing, ocean bed farming, scientific studies and explorations, and related purposes.

---

This invention concerns a floating assembly including a buoyant support for a platform from which deep sea drilling, mining, fishing, farming or other like operations can be performed.

Heretofore off-shore oil well and gas well drilling operations have been limited to relatively shallow water because their drilling platforms must be anchored to the sea bottom on steel towers. Where drilling is done from barges in deeper water, operations are restricted because the barges are relatively small and can carry only limited lengths and weights of pipe, drilling gear, well casings and other heavy equipment. Large scale, deep sea drilling, mining, fishing and farming is not possible with such barges.

The present invention provides auxiliary, controllably buoyant means for supporting a platform above the surface of a deep lake, sea or ocean. The invention is so arranged that rectangular, circular or other shaped platforms of 50,000 or more square feet are entirely practical. According to the invention a large, buoyant, multisection air chamber or dome is immersed in the sea and set underneath a horizontal platform. The air chamber supports the platform in air by direct mechanical connection. Air is supplied under pressure to the air chamber which is floated far under the surface of the water at depths where the sea is calm even in very stormy weather while upper levels of the sea may be very turbulent. The large air chamber or dome is so constructed that it can be self-propelled under water to a site of undersea operations by its own jet air power. By means of different attachments the assembly of air chamber and platform can be used for well drilling, mining, deep sea fishing, deep sea farming, and other undersea operations. The air chamber has a generally tapered dome-like shape open at the bottom. It is provided with an air valve so that the volume of air it entraps can be varied to vary the buoyancy of the assembly.

It is therefore a principal object of the invention to provide a floating assembly including a horizontal platform and large tapered, multisection air chamber or dome coupled to the platform by a plurality of rods to support the platform in air above the surface of a body of water while the air chamber floats under water, the chamber having a wide, open bottom end and entrapping air, to float under water.

Another object is to provide an assembly as described with a source of compressed air connected to the chamber for controllably determining the depth at which the chamber floats.

A further object is to provide the air chamber with walls of such shape that the chamber can be efficiently driven under water to a site of deep sea operations.

Another object is to provide the air chamber as described with means for self propelling the chamber by jet air power.

Other objects are to provide in association with the floating assembly; novel well pipe anchoring means; novel universal joint couplings for sections of the well pipe; novel alarm means for indicating when a drill is out of axial alignment with a pipe supplying drilling mud to the drill; novel means for mining or farming the bottom of the sea; and novel means for conducting large scale deep sea fishing operations.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a vertical sectional view of a floating assembly embodying the invention.

FIGS. 2, 3 and 4 are horizontal cross sectional views taken on lines 2—2, 3—3 and 4—4 respectively of FIG. 1.

FIG. 5 is a perspective view of a segment of a universal joint employed in the assembly.

FIG. 6 is a side view of part of the lower end of another floating assembly illustrating a modification of the invention, parts being broken away.

FIG. 7 is a horizontal cross sectional view taken on line 7—7 of FIG. 6.

FIG. 8 is a horizontal cross sectional view taken on line 8—8 of FIG. 7.

FIG. 9 is a diagram of an alarm circuit employed in association with the part of the assembly shown in FIGS. 6 and 8.

FIG. 10 is a side view partially in section showing the lower end of another floating assembly according to the invention.

FIG. 11 is a side view partially in section of part of still another floating assembly according to the invention.

Referring first to FIGS. 1-4, there is shown a floating assembly 10 including a multisection chamber or dome 12. The dome has a hemispherical top section 14 open at the bottom. Section 14 has a horizontal rectangular flange 16 extending radially outwardly of the diametral open bottom end of the section. A large centrally located opening 18 is provided at the top of section 14. This opening is closed by a concave circular plate 20 secured by bolts 22 to section 14.

Attached to flange 16 by bolts 24 is the flat open rectangular top 23 of intermediate section 25. Section 25 is rectangular in horizontal cross section and of tapering form vertically. Section 25 has concave outwardly and downwardly extending front and rear walls 26, 28 and flat vertical side walls 30, 32. A rectangular flange 34 extends all around the wider open bottom of section 25. In top wall 23 is a large rectangular opening 36 closed by flange 16 and hemispherical top section 14.

Attached to flange 34 by bolts 40 is flat rectangular top wall 41 of lowermost section 42. This section is shaped somewhat like an inverted boat with a bilateral, concave tapered prow or bow 44 at its front end and a convex stern bulkhead or wall 46. Sides 47, 48 of dome section 42 flare outwardly and downwardly to the wider open bottom end of the dome 12.

Four posts 49 are secured in axially vertical positions to corners of flange 16. These posts extend upwardly and terminate at corners of a horizontal platform 50, where the platform is secured to the posts.

An engined driven air compressor 52 is mounted on the platform. Its outlet 54 is connected via a valve 55 to a flexible line 56 which terminates at fitting 58 set in the side of domelike section 14. Air forced through line 56 under pressure establishes and maintains an air filled compartment 60 inside sections 14 and 25. The assembly is floated in a body of water with the dome 12 wholly immersed. The air under pressure in compartment 60 forces the water down to level L1 near the bottom of section 25. If desired, air can be released out of compartment 60 by setting valve 55 to by-pass outlet 59 for flooding sections 14 and 25 with water to any desired height. It will be apparent that dome 12 floats below the upper surface level S of the sea or other body of water in which the dome is immersed while platform 50 is elevated above surface level S of the body of water.

In order to provide mobility to the assembly, three air jet emitting pipes 61, 62 and 63 each controlled by its own valve 64 are connected to walls of section 25. Pipes 61 and 63 extend laterally outward of walls 30, 32. Pipe 62 extends rearwardly from wall 28. The valves 64 are controlled individually by flexible cables 67 terminating at a support 65 on the platform and provided with handles 69 for turning the cables to open and close the valves. An eye 66 may be connected to the forward end or edge of the platform for attachment of a line from a tugboat or other vessel which may be used to tow the platform to a site of deep sea operations.

The assembly 10 is shown set up for drilling an oil or gas wall, or for taking a sample of the earth at the sea bottom or for other related purposes.

The platform may have a large hole 70 closed by a plug 72. The plug can be removed by a suitable crane for opening the hole to lower devices of various sizes and shapes. In plug 72 is a central hole 73 lined with a sleeve 74 through this sleeve extends an axially vertical casing section 75a of a casing assembly 75. Casing section 75a extends through a sealing or packing gland 77 secured in the center of plate 20. Casing section 75a may terminate at an annular flange 78 at its bottom end secured by bolts 79 to a similar flange 81 at the upper end of another casing section 75b aligned with casing section 75a. Any desired number of casing sections may be provided. The lowermost casing section 75d will have a radial flange 83 at its upper end secured by bolts 82 to the lower flange 78' of the next higher casing section 75c.

Casing section 75d terminates in the top of a generally hemispherical universal joint housing or shell 86. This housing is made up of four spherical octants 80 shown to best advantage in FIGS. 2 and 5. Each octant has a horizontal circumferential flange 85 provided with holes 84 to receive bolts 87. The octant has two flanges 88 disposed in intersecting vertical planes and extending radially outward of the convex side wall 90 of the octant at opposite lateral edges. The flanges 88 terminate short of the apex of the octant where wall of the octant has an arcuate cut-out 90 of about 90° to receive casing 75c. Flanges 88 have holes 91 to receive bolts 92 when flanges 88 of adjacent quadrants are abutted. The bolts are engaged by nuts 92'. Nuts 87' engage bolts 87.

Secured to the underside of flanges 85 of the housing 86 is annular flange 95 of a spherically curved ring 96 whose interior surface is continuous with the spherical interior of housing 86. Rotatably enclosed between housing 86 and ring 96 is a spherically curved hollow ball 98 having top and bottom openings 99, 99'. Secured to bottom open end of ball 98 is another tubular casing section 100 which is axially aligned with casing section 75d.

Secured to casing section 100 at its lower open end is a basin 102 having an open upper concave side. Extending downwardly and flaring slightly outwardly from the bottom of basin 102 are bars 104 having upwardly slanted barbs 106 extending outwardly. A suitable explosive coil or ring 108 is mounted on the basin and is connected via electrical detonating cable 110 to a detonator device 112 on top of the platform.

It will be apparent that when the explosive coil 108 is detonated it will drive the basin axially downwardly so that the bars 104 become anchored in the bottom of the sea. The assembly 75 of the casing sections can be completed before the explosive is detonated. Casing section 75a will slide axially in sleeve 73 and gland 77 as the anchoring bars are driven downwardly. The universal joint assembly 101 accommodates to any slight misalignment between the axis of casing section 100 and casing section 75d. The drill 120 can now be lowered through the assembled casing sections. Successive lengths of drill will be connected together in conventional manner. The drill assembly 120' will extend through the open bottom of casing section 100 and basin 102. The basin 102 may then be resting on the bottom of the sea. This will anchor the entire floating assembly at the site of operations.

It will be noted that the floating assembly can be driven under its own power to the site of operations. To do this compressed air will be passed down through line 56 and will be released from compartment 60 through outlet 62 as a jet of air under water. The assembly will move forwardly in the direction shown by arrow A. The curved and tapered bow 44 will minimize turbulence and friction as the assembly is driven forwardly. For steering purposes, outlet pipes 61 or 63 can be opened to direct lateral air jets into the water. Thus the assembly can be readily turned. The assembly can be guided by an accompanying supply vessel which has a line attached to eye 66.

When the site of operations is reached, the upper end of the casing assembly 75 which may be held by a crane on top of the platform, can be released. The explosive coil 108 will be detonated to anchor the casing and entire assembly. Air will be forced into or released from compartment 60 to regulate the depth at which dome 12 floats and to set the height of the platform above the water.

It may be desired to insure that the drill assembly 120' is axially vertical in casing section 100 or nearly so, or to determine if the drill assembly is excessively out of alignment. This can be done by the alarm means shown in FIGS. 6–9. Parts corresponding to those of FIGS. 1–5 are identically numbered. An axially horizontal ring 125 is supported by arms 126 of three pushbutton type switches 130, 131 and 132. The drill assembly 120' extends centrally through ring 125. Wires 133, 134 and 135 are connected to the respective switches. The switches have terminals 136 which are grounded as shown in circuit 140 of FIG. 9. Wires 133, 134 and 135 are connected to terminals 142 of the switches. The alarm assembly 150 is mounted on top of the platform 50. This assembly includes individual signal lamps 160, 161 and 162 connected to wires 133, 134, 135 respectievly and to one end of power supply 165. In parallel with each lamp is a bell, buzzer or other audible alarm 166, 167 or 168. It will be apparent that if the drill assembly 120' moves laterally and contacts the ring 125, the ring will move horizontally and will close one or two of the three switches. This will close the circuits of the associated lamps and bells. By noting which lamp or lamps light an indication will be had of the direction in azimuth in which the drill assembly is offset from true vertical. Remedial steps can then be taken to reset the drill assembly. When the lighted lamp or lamps go out the drill assembly can be considered properly directed downwardly.

FIG. 10 shows another application of the invention in which parts corresponding to the assemblies described in connection with FIGS. 1–9 are identically numbered. The assembly includes attachment 200 which replaces basin 102 and anchor bars 104. A spherically curved substantially hemispherical dome 201 is secured to the casing section 100 extending down from the universal joint assembly 101. The lower end of section 100 extends into the dome 201 below water level L2. An air filled compartment 202 is maintained by pressurized air supplied via hose 56. The dome 201 is buoyant because of the presence of air compartment 202. The compartment can be enlarged or reduced in size depending on the desired distance the dome is to float above the bottom B of the sea or ocean. Shaft 120" extends axially down through the casing assembly 75 and terminates in the dome. The shaft is rotatably driven from the platform 50, shown in FIG. 1. The shaft carries a rotary disk 204 fitted with coarse teeth 206 for scraping the bottom B of the sea to loosen stones or pieces 210 of various minerals. The small pieces will be drawn up with the stream 212 by a pump on the platform 50. Suction is applied through the casing assembly 75. A radial flange 214 surrounds the dome to prevent entry of excessively large objects under the dome and to help stabilize the dome by lowering its center of gravity. The attachment 200 shown in FIG. 10 adapts the floating assembly for use in surface mining of the sea. Alternatively the attachment 200 can be used for dislodging and gathering or farming plants growing on the sea bottom.

FIG. 11 shows attachment 200A which can be provided as a further alternate attachment to the floating assembly 10. This attachment can be useful for fishing. Lamps 216 energized via cables 217 are installed in dome 201a, which surrounds casing section 100 depending from universal joint 101. Light from these lamps will attract fish F to swim under flange 214a into the dome. The dome floats above the bottom of the sea due to the presence of air compartment 202 maintained by air hose 56. Springy fingers 216 closely spaced apart can be attached to the underside of flange 214a. The fingers 216 completely surround the dome to prevent entry of fish larger than a predetermined desired size. The fish attracted by the light seen at the bottom of the dome will enter the dome and will pass the casing assembly in the stream 212 of sea water drawn up by a pump at the top of the platform. A flared nozzle can be provided at the bottom of casing section 100 to guide the fish in stream 212.

The assembly 10 along with attachments 200, 200a or others which can readily be devised makes it possible to conduct deep sea operations of a variety of different types from a large buoyant platform. Such a platform can be 100 or 200 or more feet in length and width. Large sizes of 50,000 or more square feet are entirely practical. The large multisection dome 12 which is the primary support for the platform 50 can be driven under its own power as a jet propelled undersea watercraft to the site of operations. The invention makes it possible to conduct useful commercial and scientific operations at great depths without requiring the erection of elaborate complex mechanical superstructures. The floating assembly can readily be moved to some other site when necessary without requiring laborious, expensive dismantling operations. If desired a valve 250 can be installed in casing section 75d as shown in FIG. 1 to close off the lower end of the casing section 75d. The casing section along with joint 101 and anchoring basin 102 can be left in place at the site of a well while the remainder of the assembly is driven off to another location. The casing assembly 75 will be disengaged by removing bolts 82 holding flanges 78' and 83 together, or it can be done by unscrewing section 75c from flange 78'. In any case the floating assembly 10 will be released and can then be driven to another location. If the assembly is used for fishing or mining with no part of the assembly engaged in the sea bottom, then the entire assembly can easily be moved to another site under the sea.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A floating assembly useful for deep sea operations comprising a tapered dome adapted for immersion entirely in a body of water in an axially vertical position, said dome having a closed smaller top and open wider bottom, a plurality of spaced posts extending upwardly from the dome a horizontal platform supported at upper end of the posts, a supply of compressed air opening inside of the dome near its upper end to maintain an air filled compartment inside the dome while water enters the open bottom of the dome to a certain level, said level being determined by pressure of air in said compartment, whereby the dome floats bouyantly wholly immersed in the body of the water while supporting the platform above the surface of the water, said dome having multiple sections, the lowermost one of the dome sections having the general shape of an inverted boat with tapered prow, a curved, broad stern wall and outwardly and downwardly inclined side walls, to increase bouyant stability of the dome and to facilitate driving the floating assembly in a horizontal direction to a site of deep sea operations while the dome remains under water.

2. A floating assembly as recited in claim 1, further comprising an assembly of axially vertical tubular casing sections extending downwardly from said platform through the top of the dome and downwardly to a point near the bottom of said body of water for conducting said deep sea operations thereat.

3. A floating assembly as recited in claim 2 further comprising a basin carried by the lowermost one of the casing sections, and a plurality of rods with laterally extending barbs secured to said basin, whereby the basin can be driven downwardly by explosive means to the sea bottom to rest on the sea bottom while the rods penetrate the sea bottom to anchor the casing assembly, dome and platform.

4. A floating assembly as recited in claim 3 further comprising universal joint means casing section for accommodating the casing assembly to a slight axial misalignment with said basin when the basin is driven to the sea bottom.

5. A floating assembly as recited in claim 1 further comprising valve controlled outlets connected to said dome and opening into said compartment for discharging air jets laterally outwardly of the dome to drive the dome in a horizontal direction while under water to a site of deep sea operations.

6. A floating assembly as recited in claim 2, further comprising universal joint means connected between the lowermost one of said casing sections and to accommodate the casing assembly to a slight axial misalignment of the lowermost casing section with the remainder of the casing sections, and an alarm assembly including alarm means, and switch means in the lowermost one of the casing sections connected with the alarm means and operable by a drill shaft extending axially through the casing assembly, when the drill shaft is excessively displaced laterally from the axis of the casing assembly in any direction, whereby the condition of and direction of shaft displacement are indicated by said alarm means.

7. A floating assembly as recited in claim 2, further comprising a buoyant other dome secured to the lowermost one of the casing sections, means for maintaining an air filled other compartment in the other dome, said lowermost one of the casing sections extending into the other dome for drawing a stream of water with entrained objects such as fish, minerals, plants and the like up the casing assembly when suction is applied thereto.

8. A floating assembly as recited in claim 2, further comprising universal joint means between the lowermost one of the casing sections and the next upper casing section for accommodating the casing assembly to a slight axial misalignment of the lowermost casing section with the upper casing sections, said universal joint means comprising an upper hemispherical shell having abutted segments with flanges at their abutted edges bolted together, a flanged ring bolted to other flanges of the segments, and a hollow ball turnable in said shell and ring, the lowermost one of the casing sections being secured to said ball and the next upper one of the sections being secured to said shell.

References Cited

UNITED STATES PATENTS

| 1,749,958 | 3/1930 | Randell. | |
|---|---|---|---|
| 2,889,795 | 6/1959 | Parks. | |
| 2,938,353 | 5/1960 | Vorenkamp | 61—46.5 |
| 3,285,213 | 11/1966 | Whittle. | |

FERGUS S. MIDDLETON, *Primary Examiner.*

TRYGVE M. BLIX, *Examiner.*